(12) United States Patent
Higgins et al.

(10) Patent No.: US 7,505,740 B2
(45) Date of Patent: Mar. 17, 2009

(54) SYSTEM AND APPARATUS FOR ANTENNA IDENTIFICATION AND CONTROL

(75) Inventors: Robert J. Higgins, Plantation, FL (US); Ellis A. Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 829 days.

(21) Appl. No.: 10/649,443

(22) Filed: Aug. 26, 2003

(65) Prior Publication Data

US 2005/0049020 A1    Mar. 3, 2005

(51) Int. Cl.
*H04B 1/38* (2006.01)
(52) U.S. Cl. .................. 455/90.3; 455/575.7; 455/80; 455/129; 455/575.5; 455/562.1; 343/895; 343/702; 343/713; 343/715
(58) Field of Classification Search .............. 455/277.1, 455/575.7, 277.2, 80, 129, 133; 343/895, 343/702, 713, 703, 715
See application file for complete search history.

(56) References Cited

U.S. PATENT DOCUMENTS

| | | | | | |
|---|---|---|---|---|---|
| 4,641,366 | A | * | 2/1987 | Yokoyama et al. | 455/73 |
| 5,619,213 | A | * | 4/1997 | Hays, III | 343/703 |
| 5,794,145 | A | * | 8/1998 | Milam | 455/426.1 |
| 5,825,330 | A | * | 10/1998 | Na et al. | 343/702 |
| 5,841,405 | A | * | 11/1998 | Lee et al. | 343/795 |
| 5,894,292 | A | * | 4/1999 | Everest et al. | 343/895 |
| 5,987,037 | A | * | 11/1999 | Gans | 370/480 |
| 6,054,955 | A | * | 4/2000 | Schlegel et al. | 343/702 |
| 6,061,024 | A | * | 5/2000 | McGirr et al. | 343/700 MS |
| 6,140,970 | A | * | 10/2000 | Ylijurva | 343/702 |
| 6,408,188 | B1 | * | 6/2002 | Park | 455/466 |
| 6,437,756 | B1 | * | 8/2002 | Schantz | 343/866 |
| 6,456,248 | B2 | * | 9/2002 | Ito | 343/702 |
| 6,486,832 | B1 | * | 11/2002 | Abramov et al. | 343/700 MS |
| 6,771,980 | B2 | * | 8/2004 | Moon | 455/553.1 |
| 6,788,270 | B2 | * | 9/2004 | Suprunov et al. | 343/866 |
| 6,980,782 | B1 | * | 12/2005 | Braun et al. | 455/277.2 |
| 7,003,279 | B2 | * | 2/2006 | Nickum | 455/405 |
| 7,038,626 | B2 | * | 5/2006 | Gothard et al. | 343/702 |
| 7,206,600 | B2 | * | 4/2007 | Reece et al. | 455/550.1 |
| 2001/0054979 | A1 | * | 12/2001 | Bahr et al. | 343/700 MS |

OTHER PUBLICATIONS

Dallas Semiconductor, DS2430A 256 Bit 1-Wire EEPROM, pp. 1-16, Feb. 2002.

* cited by examiner

*Primary Examiner*—Marceau Milord
(74) *Attorney, Agent, or Firm*—Barbara R. Doutre

(57) ABSTRACT

An antenna (104) and antenna interface system (200) are provided that allow both RF and baseband signals to be transported over a single antenna/communication device coaxial center connector (110, 120). A single wire memory device (134) is embedded into the antenna (104) and electrically coupled to the antenna's center conductor (110). Frequency diplexing (114, 116) is used to transport the single wire bus communications between the antenna (104) and the communication device, such as a radio (102).

2 Claims, 1 Drawing Sheet

SYSTEM AND APPARATUS FOR ANTENNA IDENTIFICATION AND CONTROL

TECHNICAL FIELD

This invention relates in general to antennas and more particularly to antenna identification and control in a communication device.

BACKGROUND

Portable radios often come equipped with replaceable antennas, removable battery packs and a variety of interchangeable accessories, such as remote earpiece or speaker microphone. Some radio products are being equipped with a single wire bus connection at an accessory connector to identify attached accessories with a memory device embedded in the accessory. An embedded memory device has also been used in smart batteries to identify the battery cell chemistry and capacity. Replacement antennas, however, must be of the same type, operating over the same band, and are simply used to replace antennas that have been lost or misplaced by the operator. The antenna, though replaceable, is not typically viewed as an interchangeable device since the radios usually operate only in a particular frequency band and antennas must be crafted to work properly with a particular radio model.

Portable radios are typically designed as platforms with standardized connectors for the antenna. Since the radios may operate only in a particular band, it is incumbent on the radio operator to install the proper antenna for radio operation. Many antennas look alike and it may not be obvious to the operator whether the correct antenna is installed for a particular operating band. If the wrong antenna is coupled to the radio, the radio will not operate properly within the communications system. Experience has shown that regardless of instructions in the radio's manual for proper antenna selection, a significant percentage of radios are found to be equipped with the wrong antenna for the radio's intended use.

Accordingly, there is a need for an antenna apparatus and system that provides an unambiguous means for the radio itself to determine if the correct antenna has been installed, allowing error messages to be reported if the wrong antenna is in place. Additionally, an antenna that could be tuned to operate over a broader bandwidth and provide greater radiating efficiency would be highly desirable to reduce the number of antenna models from which to select.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
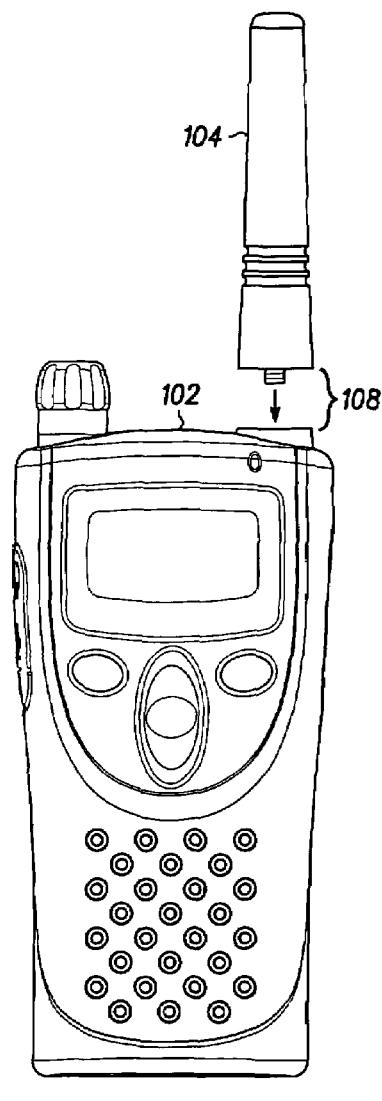
FIG. 1 is a portable radio formed in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein an apparatus and system that provides an unambiguous means for a portable communication device to determine itself if the correct antenna has been installed, allowing error messages to be reported if the wrong antenna is in place. Additionally, the apparatus and system of the present invention allow digital communications with the antenna that can be used to actuate a tuning means within the antenna to provide antennas that operate over broader bandwidth and provide greater radiating efficiency. While the present invention will be described in terms of a portable radio, other portable communication devices having removable antennas can also derive benefit from the antenna system of the present invention.

Figure 2:
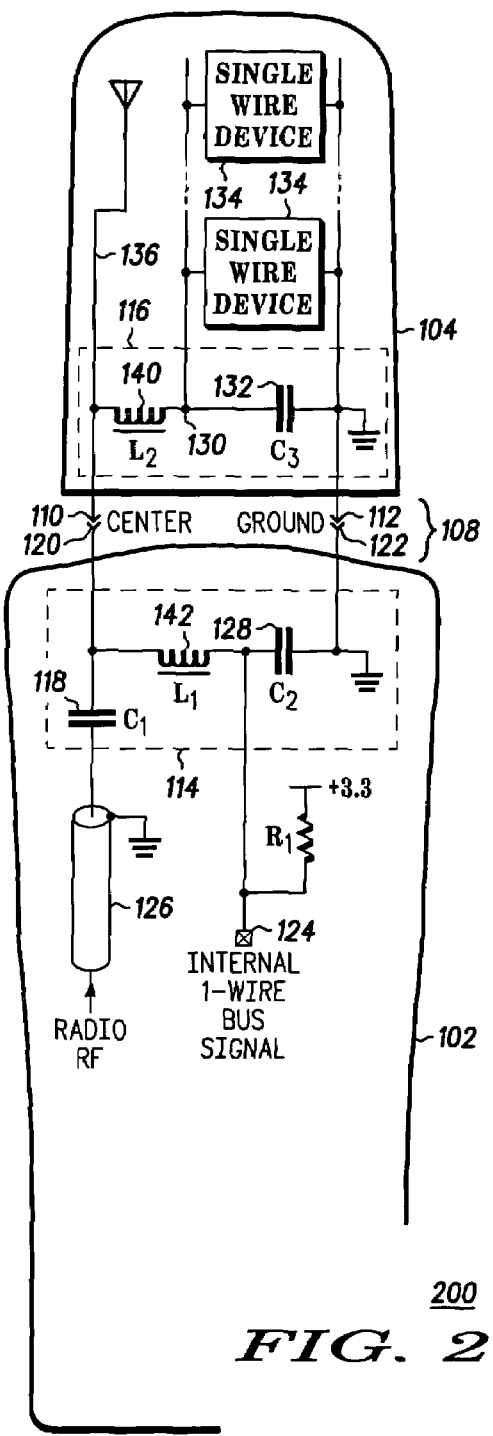
FIG. 2 is an antenna interface system having a coaxial single wire bus antenna feed in accordance with the present invention.

FIG. 1 is a portable communication device, here shown as a portable radio 102, formed in accordance with the present invention. FIG. 2 is an electrical block diagram of an antenna interface system 200 having a coaxial single wire bus antenna feed formed in accordance with the present invention. Incorporation of single wire bus communications into antenna 104 allows one or more single wire memory devices 134 to be molded into the antenna. The single wire memory device is an imbedded memory subsystem communicating with a processor via a single wire data communications bus. In accordance with the present invention, memory device 134 includes antenna parameters stored therein, providing The coaxial single wire bus antenna feed may be implemented using a single wire bus system, such as a 1-Wire® bus system available from Dallas Semiconductor, which is a system that has a single bus master, typically a microcontroller, and one or more slaves. The 1-wire bus has a single line in addition to ground and each device on the bus is able to drive it at the appropriate time. Referring to both FIGS. 1 and 2, radio 102 has a removable antenna 104. Antenna 104 couples to radio 102 via a coaxial connector pair 108 having an antenna coaxial center conductor 110 and antenna ground 112 on the antenna side and radio coaxial center conductor 120 and radio ground 122 on the radio side. In accordance with the present invention, radio 102 includes electronic circuitry 114 for diplexing RF and baseband signals and antenna 104 includes electronic circuitry 116 for diplexing RF and baseband signals. In accordance with the present invention, the coaxial interface 108 couples the radio 102 and the antenna 104 and provides a transport for both RF and baseband signals.

In accordance with a preferred embodiment, the electronic circuitry which accomplishes the frequency division filtering is implemented as follows. On the radio side, a radio RF signal 126 is capacitor coupled, through capacitor 118, to the radio coaxial center conductor 120. The capacitive connection is designed to pass with high efficiency the high frequency RF signals while blocking baseband signals. The single wire bus 124 is DC coupled to the coaxial connector center conductor 110 through an RF blocking inductor, L1, 142. Inductor 142 has negligible impedance to the frequency of single wire bus signals, but provides very high impedance at RF frequencies to prevent loading of the RF path. Capacitor, C2, 128 further prevents any residual RF from entering the single wire bus radio interface 124 by providing a low impedance short to RF signals while not substantially loading the low frequency baseband signals. This frequency division filtering for interconnection is commonly known as diplexing.

On the antenna side 104, the RF and baseband signals are separated once again using a means similar to the intermixing done in radio 102. Inductor L2, 140 prevents RF from entering the antenna's single wire bus node 130 because it is high impedance at the RF frequency, while at the low single wire baseband frequencies, L2, 140 allows the signals to pass. Capacitor, C3, 132 removes residual RF from the antenna single wire bus 130 without substantial loading of the single wire bus signals.

The result, in accordance with the present invention, is transport of both the RF signal and the single wire bus signal across the same single coaxial connector 108 normally used for the antenna. A radiating element 136 transports the RF signal while one or more single wire memory devices 134 are used to store information. Other components, such as other RF bypass capacitors, may be included as well depending on the antenna design.

Incorporation of single wire bus communications into antenna 104 allows the single wire memory device 134, such as an EEPROM, to be molded into the antenna. The single wire memory device 134 is programmed with information identifying the antenna and describing the antenna's capabilities. For example, the EEPROM can have the antenna model number, manufacturer ID, known compatible radio models, nominal minimum and maximum frequencies of operation, nominal impedance level, maximum power level as a function of frequency, radiating efficiency as a function of frequency, model parameters for impedance change in proximity to human body, and electronic control specifications as well as other parameters.

The antenna parameters stored in the antenna memory provide a means for the radio itself to determine if the correct antenna has been installed. If an incorrect antenna is coupled to the radio an error message is reported to the user. The notification of a wrong antenna can take on a variety of form factors including audio, such as through a tone or warning message, or visual, such as through an LCD display or warning LED. Transmit operation can also be prohibited or restricted if a wrong antenna is detected.

The antenna interface system 200 formed in accordance with the present invention and utilizing various antenna parameters also allows the antenna 104 to be tuned to operate over a broader bandwidth and/or variable bandwidth and provides greater radiating efficiency. For example, providing impedance versus frequency parameters in the antenna's memory allows the radio 102 to automatically impedance match to the antenna impedance as the radio changes frequency without having to measure the antenna impedance thereby providing improved radiation efficiency with minimal radio overhead.

Providing radiation efficiency as a function of frequency in the antenna's memory provides a means of leveling the radio's effective rated power (ERP). If the radio 102 determines that the antenna 104 is more efficient in a particular frequency range, the radio can reduce its transmission power and save battery power. Maintaining consistent ERP is especially important when a radio is operating at maximum allowable power levels for a given frequency. Also, since antennas with different gains are commonly sold for the same band, more power can be used for a less efficient antenna.

Though the single wire bus is provided to allow communications with the EEPROM, additional devices can be used within the antenna to provide control of the antenna's parameters. For example, a parallel output single wire I/O device can be placed on the same single wire bus and provide a means to close switch contacts (FETs or MEMs) that can alter the operating frequency of the antenna. The alterable frequency capability permits the antenna to switch bands or operate over a wider (manipulated) frequency range. Thus, the antenna system of the present invention can be tuned to operate over a broader bandwidth and provide greater radiating efficiency.

Today's antenna is equipped with coaxial connectors for the radio/antenna interface. While it is possible to add a third contact to the antenna to add the single wire bus communications interface, it is not necessary to do so. The antenna system of the present invention can make use of the existing coaxial antenna connector along with circuitry within the radio and antenna to enable both the RF and the single wire bus communications over the single coaxial interface.

Accordingly, there has been provided a smart antenna and antenna interface system that provides an unambiguous means for a radio to determine itself if the correct antenna has been installed, allowing error messages to be reported if the wrong antenna is in place. Additionally, the antenna of the present invention provides increased operating versatility through the addition of single wire bus communication to the antenna and the use of frequency diplexing to transport the single wire bus into the antenna using only the existing coaxial antenna connector. Adding smart capability to the antenna provides a tunable antenna that broadens the operation versatility for a radio product. The antenna of the present invention can be adjusted in accordance with operating parameters of the radio and/or the radio can likewise adjust itself based on operating parameters stored in the antenna. The dynamic antenna interface of the present invention allows one antenna to cover several bands minimizing the number of antennas needed to be designed and stocked and allowing the radio system to quickly change frequency over a wider bandwidth when previously limited solely by antenna bandwidth.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An antenna for a portable communication device, the antenna including at least one single wire memory device programmed with antenna parameter information, the antenna parameter information within the antenna being accessed by the portable communication device; and a parallel output single wire I/O device placed on the at least one single wire memory device within the antenna for controlling predetermined antenna parameters that opens and closes switch contacts to alter the operating frequency of the antenna; and wherein the single wire memory device provides impedance versus frequency parameters, the portable communication device automatically impedance matching to the antenna impedance as the portable communication device changes frequency without having to measure the impedance of the antenna.

2. An antenna interface system, comprising:

an antenna center conductor within an antenna;

a single wire memory device within the antenna, the single wire memory device electrically coupled to the antenna center conductor;

a radio center conductor for coupling to the antenna center conductor;

a parallel output single wire I/O device placed on the single wire memory within the antenna for controlling predetermined antenna parameters that opens and closes switch contacts to alter the operating frequency of the antenna; and wherein the single wire memory device provides impedance versus frequency parameters, the radio automatically impedance matching to the antenna impedance as the radio changes frequency without having to measure the impedance of the antenna.

* * * * *